United States Patent [19]
Thompson et al.

[11] Patent Number: 5,964,322
[45] Date of Patent: Oct. 12, 1999

[54] ELEVATOR SAFETY BRAKE HAVING A PLASMA SPRAYED FRICTION COATING

[75] Inventors: Mark S. Thompson, Tolland; Raymond Zatorski, East Hampton; James T. Beals, West Hartford; Philip H. McCluskey, Manchester; David W. McKee, Somers; Michael C. Lang, Naugatuck; Fred J. Lussier, Hebron; Dat T. Nguyen, West Hartford; Paul Bennett, Waterbury, all of Conn.

[73] Assignee: Otis Elevator Company, Farmington, Conn.

[21] Appl. No.: 08/965,473

[22] Filed: Nov. 6, 1997

[51] Int. Cl.$^6$ ..................................................... F16D 69/00
[52] U.S. Cl. ..................................................... 188/251 M
[58] Field of Search ........................... 188/250 R, 251 R, 188/252, 253, 254, 255, 256, 257, 258, 259, 251 A, 251 M

[56] References Cited

U.S. PATENT DOCUMENTS

| | | | |
|---|---|---|---|
| 3,539,192 | 11/1970 | Prasse | 277/224 |
| 3,655,425 | 4/1972 | Longo et al. | 117/100 M |
| 3,897,582 | 7/1975 | Olcott | 428/114 |
| 4,146,654 | 3/1979 | Guyonnet | 427/34 |
| 4,351,885 | 9/1982 | Depoisier et al. | 428/544 |
| 4,833,040 | 5/1989 | Fishman et al. | 428/570 |
| 5,503,257 | 4/1996 | Sugita et al. | 188/251 R |

FOREIGN PATENT DOCUMENTS

| | | |
|---|---|---|
| 2261480 | 5/1993 | United Kingdom . |
| 2274827 | 8/1994 | United Kingdom . |
| 2287451 | 9/1995 | United Kingdom . |

*Primary Examiner*—Robert J. Oberleitner
*Assistant Examiner*—Robert A. Siconolfi

[57] ABSTRACT

An elevator safety brake for stopping an elevator car is provided with a brake shoe having a fused sprayed friction coating for contacting an elevator guide rail surface to provide a stopping force. In a preferred embodiment, the coating is obtained by plasma spraying an admixture of 85 weight percent nickel-chromium alloy particles and 15 weight percent tungsten carbide particles on a substrate. The plasma sprayed admixture is fused. The fused sprayed friction surface of the brake exhibits a consistent high friction and low wear suitably accommodating high speed, high load elevators installed in very tall buildings.

12 Claims, 3 Drawing Sheets

ELEVATOR SAFETY BRAKE HAVING A PLASMA SPRAYED FRICTION COATING

BACKGROUND OF THE INVENTION

1. Field of the Invention

The present invention generally relates to a safety braking system for slowing or stopping a vertically moving object, such as an elevator car, in an over speed condition. More particularly, the present invention relates to an elevator safety brake system for slowing or stopping an elevator car having a fused sprayed friction coating.

2. Description of the Prior Art

A typical safety braking system is attached to an elevator car and comprises a pair of wedge shaped brake shoes having substantially flat frictional surfaces. The flat frictional surfaces are ordinarily positioned on opposite sides of the stem portion of a T shaped guide rail supported on an elevator hoistway wall. These wedge shaped brake shoes are activated by a governor mechanism which forces the wedge shaped brake shoes along an adjacent guide shoe assembly which in turn forces the frictional surfaces of the brake shoes to make contact with the guide rail to slow or stop the car.

In a typical safety braking system, the wedges may be loaded with up to approximately 56,000 lb (250,000 N) normal force by applying approximately 8000 psi over a 7 $in^2$ surface (55,000 kPa×0.0045 $m^2$)). Using cast iron frictional surfaces having a nominal coefficient of friction with respect to the guide rail at approximately 6 m/s of approximately 0.15, the 56,000 lb (250,000 N) force acting upon a wedge creates a frictional force of approximately (11,200 lb (50,000 N) on the frictional surface of the wedge. In a conventional elevator cab design using cast iron frictional surfaces, there are four frictional surfaces which generate a total potential stopping force of approximately 45,000 lb (200,000 N).

As very tall buildings are built, high speed, high load elevators (typically 4 to 8 m/s but up to 12.5 m/s) have become necessary to service the numerous floors in such buildings. Such elevators have a load rating of up to about 16,000 kg. The safety breaking requirements of such elevators have become increasingly demanding. It has been determined that conventional gray cast iron cannot operate as a consistent friction material at high speeds and loads required by such modern elevator systems due to breaking failures caused by excessive wear and a reduced coefficient of friction caused by high frictional heating. Accordingly, there is a need for elevator safety brake shoes made with alternative friction materials which provide low wear and consistent high friction to accommodate the high speeds and loads of elevators installed in very tall buildings.

SUMMARY OF THE INVENTION

It is an object of the present invention to provide an elevator safety brake for stopping an elevator car.

It is another object of the present invention to provide a reliable elevator safety brake having a consistent high coefficient of friction and low wear for use in high speed, high load elevators.

These objects are accomplished, at least in part, by an elevator safety brake having a brake shoe formed from a base and a rail contacting friction surface attached to the base for contacting an elevator guide rail surface. At least a portion of the rail contacting friction surface comprises a coating obtained by spraying a powder admixture of nickel-chromium alloy particles and tungsten carbide particles onto the base and fusing the sprayed admixture. The safety brake is further provided with an actuator for pressing the friction material of the brake shoe against the guide rail surface to stop the elevator car.

BRIEF DESCRIPTION OF THE DRAWINGS

The drawings, not drawn to scale, include.

DETAILED DESCRIPTION OF THE INVENTION

Figure 1:
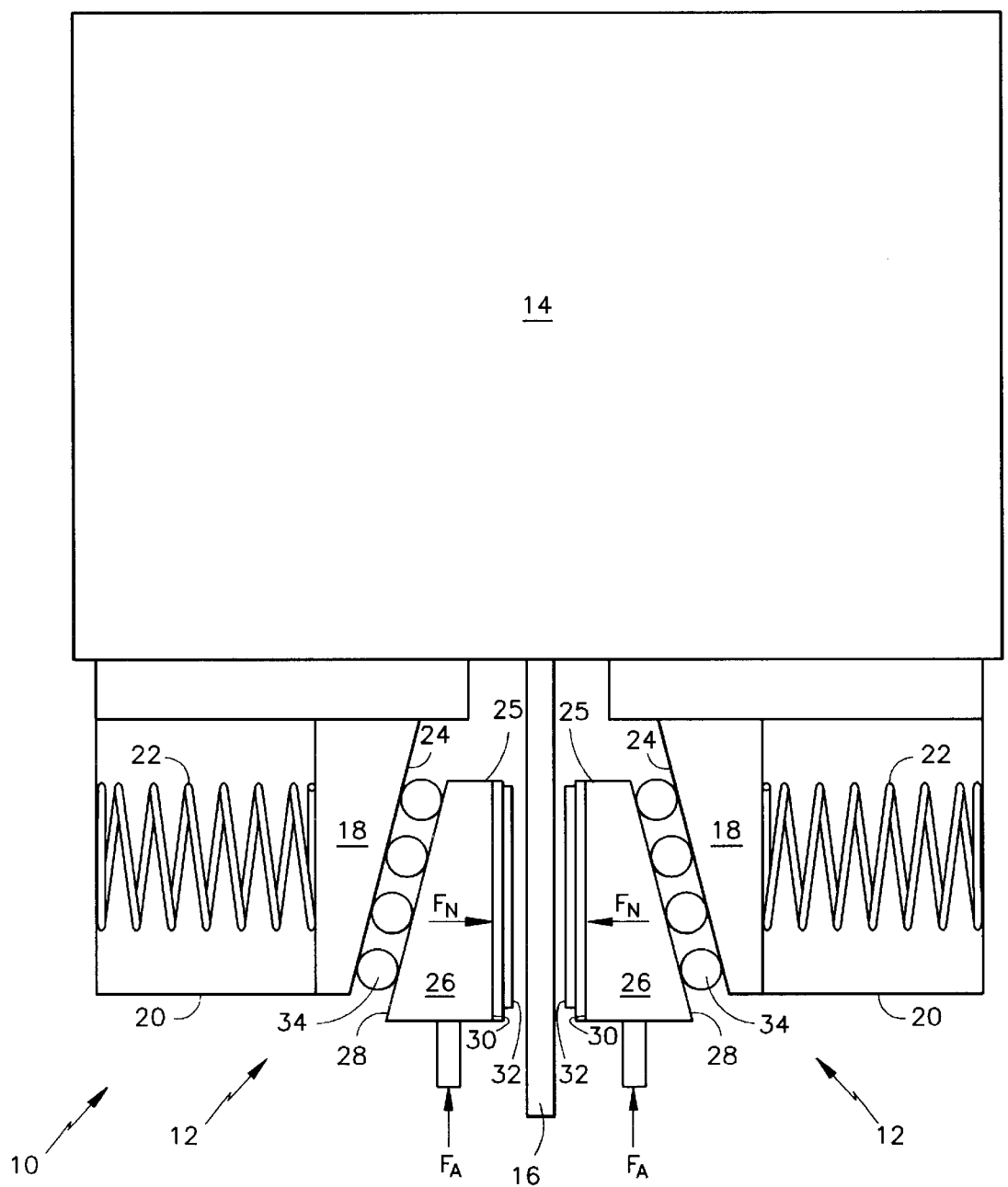
FIG. 1, which is a simple schematic illustration of an elevator safety brake system with two friction wedges positioned on opposite sides of a guide rail.

FIG. 1 provides a simplified schematic illustration of a known elevator safety brake system upon which the present invention may be used. The brake system 10 comprises a pair of actuators 12 which are attached to an elevator car 14 and positioned in an opposing relationship about a guide rail 16 supported in an elevator hoistway (not shown). The actuators 12 are formed, in part, by a wedge shaped guide shoe 18 which is movable within housing 20 in a direction which is generally perpendicular to the guide rail 16. The guide shoe 18 is biased towards the guide rail 16 by spring 22. The guide shoe 18 has an inclined cam surface 24. A wedge shaped brake shoe 25 having base 26 is provided so as to have an inclined cam surface 28 which is complimentary to the inclined cam surface 24 of the guide shoe 18. The brake shoe 25 is also provided with a rail facing surface 30. The brake shoe 25 is positioned between the guide shoe 18 and the rail 16. A brake pad 32 having a high friction material is attached to the rail facing surface 30 of the brake shoe base 26. A roller cage assembly containing a plurality of rollers 34 is positioned between the inclined cam surface 24 of the guide shoe 18 and the complimentary inclined guide shoe facing surface 28 of the brake shoe 25. The rollers 34 provide a low friction contact between the complimentary inclined adjacent surfaces 24 and 28 of the guide shoe 18 and the brake shoe 25, respectively. The guide shoe 18, biased by spring 22, applies normal force $F_N$ in the direction of the rail 16 on brake shoe 25 through rollers 34.

In an emergency or overspeed situation wherein the application of the brake system 10 is desired, a force $F_A$ in the direction parallel to the guide rail 16 is applied to the wedge shaped brake shoes 25 which causes the shoes 25 to move towards the elevator car 14. Ordinarily, force $F_A$ is supplied by a rope, cable or mechanical linkage connected to a governor (not shown). The inclined complimentary cam surfaces 24 and 28 of the guide shoe 18 and the brake shoe base 26, respectively, cause the brake shoe 25 to move towards the rail 16 until contact between the pad 32 and the rail 16 is made. As those skilled in the art will appreciate, the pad 32 is applied to the rail 16 with normal force $F_N$ supplied by the spring 22. The amount of braking force developed by normal force $F_N$ is substantially and directly proportional to the friction coefficient $\mu_k$ between the high friction material used in the brake pad 32 and the rail material 16. As braking occurs, heat tends to become accumulated in the brake pad 32 which can deleteriously reduce the friction coefficient $\mu_k$ between the pad material and rail material. If the heat becomes high enough for a given material, a substantial reduction in the hardness, as well as deformation or fusion of the high friction material may occur, which in turn may cause brake failure.

In the prior art, the brake pad 32 used in the brake system 10 to provide a friction surface has been formed from gray cast iron. Gray cast iron, while suitable for low speed, low load conditions, cannot operate as a consistent friction material at high speed and/or load conditions. In view of the short comings of gray cast iron in such applications, it has been found that a friction material formed from a fused sprayed coating of a nickel-chromium alloy and metal carbide composition performs suitably for such applications. A brake pad having the fused sprayed coating made according to the present invention, which will be described more fully below, is capable of operation under the conditions required for an elevator operating at contract speeds of up to 10 meters per second with a load rating of up to 16000 Kg. It has been further found that the brake pads made in accordance with the present invention have significant mechanical toughness, thermal shock resistance, negligible wear rates on rail steel and appreciable coefficient of friction on rail steel. Such fused sprayed coatings made according to the present invention are described by way of examples below.

EXAMPLE 1

An admixture of approximately 85 weight percent nickel alloy (Alloy 16) powder and 15 weight percent tungsten carbide alloy powder was screened to obtain particles having a size range of −50 to +20 mesh. The nickel alloy powder comprised approximately 67 weight percent nickel, 16 weight percent chromium, 4 weight percent silicon, 4 weight percent boron, 3 weight percent copper, 3 weight percent molybdenum, 2.5 weight percent iron, and 0.5 weight percent carbon. The tungsten carbide alloy powder comprised approximately 83 weight percent tungsten, 12 weight percent cobalt, 4 weight percent carbon and 1 weight percent iron. The admixture was sprayed using a combustion spray process with a Metco 5P spray gun having a P7-G nozzle employing the following parameters:

oxygen at 30 psi (6.9 Kpa) and 60 cubic feet/hr (28.3 liters/hr) flow;

acetylene at 15 psi (3.5 Kpa) at 33 cubic feet/hr (15.6 liters/hr) flow;

sprayed at the rate of 14 lbs/hr (6.4 kg/hr); and spray distance of 8 inches (20.3 cm).

EXAMPLE 2

The same admixture of approximately 85 weight percent nickel alloy (Alloy 16) powder and 15 weight percent tungsten carbide alloy powder was screened to obtain particles having a size range between −50 and +20 mesh. The admixture was sprayed using an arc-plasma spray process with a Metco 3MB/7MB/9MB spray gun having a GH nozzle employing the following operating parameters:

Argon at 110 psi (758 Kpa) and 100 cubic feet/hr (47.2 liters/hr) flow;

Hydrogen at 60 psi (414 Kpa) and 15 cubic feet/hr flow (7.1 liters/hr), adjusted to maintain voltage; and 400 amps, 60–65 volts.

The powder was fed to the gun by a Plasma-Technic Twin 10C powder feeder with Argon at approximately 55 psi (380 Kpa) at a gas flow rate of 6 liters/hr. The material was sprayed at a rate of 10 lbs/hr (4.5 kg/hr) at a distance of 5 to 6 inches (12.7 to 15.2 cm).

EXAMPLE 3

An admixture of approximately 70 weight percent nickel alloy (Alloy 16) powder and 15 weight percent tungsten carbide alloy powder was screened to obtain particles having a size range of −50 to +20 mesh. The admixture was sprayed using a combustion spray process with a Metco 5P spray gun having a P7-G nozzle employing the following parameters:

oxygen at 30 psi (6.9 Kpa) and 60 cubic feet/hr (28.3 liters/hr) flow;

acetylene at 15 psi (3.5 Kpa) at 33 cubic feet/hr (15.6 liters/hr) flow;

sprayed at the rate of 14 lbs/hr (6.4 kg/hr); and spray distance of 8 inches (20.3 cm).

In each of the above examples, the spraying step was followed by a fusing step wherein the sprayed coating was placed in an inert atmosphere furnace and the temperature of the inert atmosphere was raised to 1000° C. at a rate of 50° C. per min and held at that temperature for approximately 10 minutes. The temperature of the inert atmosphere was then raised to 1080° C. at a rate of 25° C. per minute and held at this temperature for approximately 25 minutes. The temperature of the inert atmosphere was reduced to 482° C. at a rate of approximately 20° C. per minute and held for approximately 1 minute. Finally, the inert atmosphere was returned to room temperature at a rate of 4° C. per minute.

30 mm diameter test tiles having chamfered edges were made from the coated substrates. The test tiles were loaded with a normal force of approximately 11,000 N against a rotating 2 meter diameter disk under conditions which were selected to simulate an emergency stop on a typical steel hoistway guide rail surface under high load and high velocity conditions. In Examples 1 and 2, where the nickel-chromium alloy was about 85 weight percent and the tungsten carbide material was about 15 weight percent, a frictional force of nearly 6000 N was generated which indicates that the fused sprayed coating material had a nominal coefficient of friction with the rail steel greater than about 0.4 which is about 1.5 times that of typical gray cast iron grade 30. The fused sprayed coating materials showed very little wear, about less than 10 percent of the wear exhibited by the typical cast iron grade 30 under the same test conditions. The rail damage caused by the fused sprayed coatings was equivalent to the damage caused by grade 30 cast iron. The material performed adequately under all rail conditions simulated (clean rail, rusted rail, oiled rail, wet rail and roughened rail).

In other test samples, the weight percentage of nickel-chromium alloy in the admixture was varied to as high as 95 percent and as low as 55 percent. The best results were found to occur when the nickel-chromium alloy represented approximately 85 weight percent of the admixture. Also, in addition to the size range of particles set forth in the examples, a size range from −75 to +45 mesh was also investigated. The larger powder size was determined to provide a coating with a higher friction coefficient.

Figure 2:
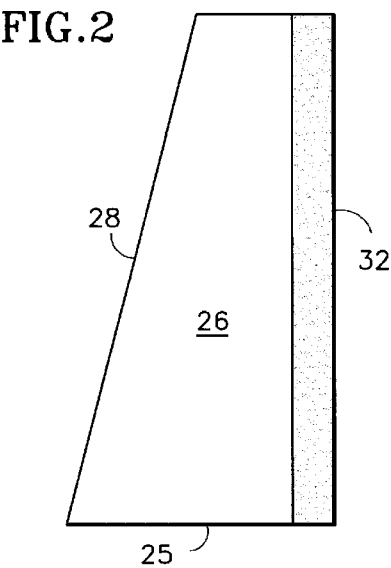
FIG. 2, which is a simple schematic illustration of an elevator safety brake having a plate formed from a plasma sprayed friction material.
Figure 3:
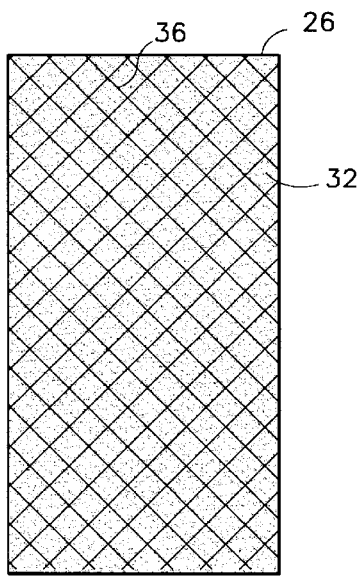
FIG. 3, which is a simple schematic illustration of the embodiment of FIG. 2 further including a cross hatch pattern machined into the plasma sprayed friction coating.

Referring to FIG. 2, according to one embodiment of the present invention, a fused spray coating may be formed on a substrate which is mechanically attached to a cast iron wedge shaped brake shoe base 26. Of course, those skilled in the art will appreciate that the fused combustion or plasma spray material may be sprayed directly on the rail facing surface 30 of a steel or cast iron brake shoe base 26. As illustrated in FIG. 3, a cross hatch pattern 36 may be machined therein to provide a topography to the friction surface.

Figure 5:
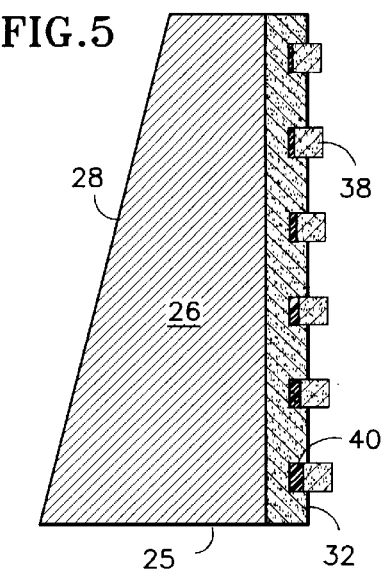
FIG. 5, which is a simple cross-sectional view of the embodiment illustrated in FIG. 4, taken along the line 5—5 to illustrate the attachment of the friction tiles via a compliant material.
Figure 4:
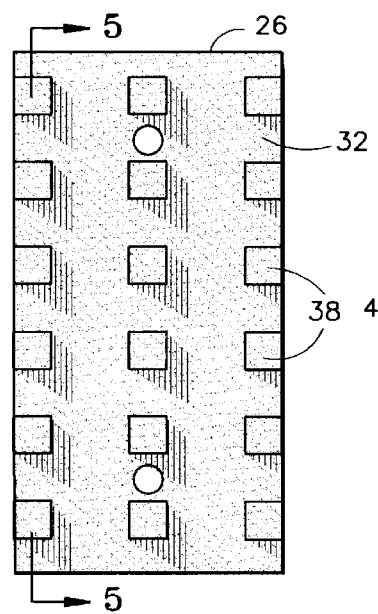
FIG. 4, which is a simple schematic illustration of an alternative embodiment of the present invention showing a plurality of plasma sprayed friction tiles attached to the rail facing surface of the shoe base.

Referring to FIGS. 4 and 5, alternatively, the friction surface may be formed from a plurality of tiles 38 of the fused sprayed material. The tiles 38 may be attached to the base 26 directly via mechanical fasteners (not shown) or alternatively, the tiles may be attached to the base 26 via a compliant material interface 40 which enables resilient movement of the alloy friction material relative to the base 26 and allows a greater number of tiles to make contact with the rail surface in the event that the rail facing surface of the brake shoe base 26 is not perfectly true with the rail 16. Compliant material which may be used in the present invention includes heat resistant rubber like materials such as heat resistant silicone. Like the single plate 34, one or more of the tiles 40 may be provided with a cross hatch pattern machined therein (not shown).

Figure 6:
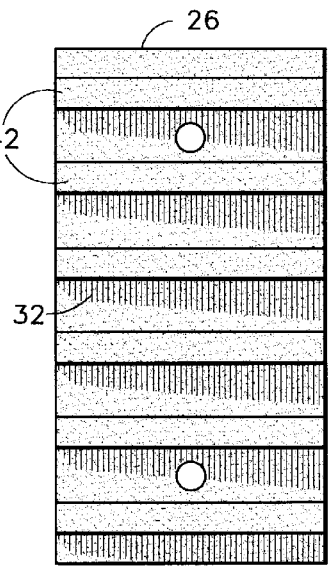
FIG. 6, which is a simple schematic illustration in which the fused plasma sprayed friction material is attached to the base of the brake shoe in the form of a plurality of pins.

Referring to FIG. 6, the friction surface may also be formed from a plurality of pins 42 of the alloy material which are positioned so as to be generally transverse to the direction of relative movement between the friction surface and the guide rail surface. In most cases, these pins 42 are oriented horizontally in a elevator system, however, they need not be. The pins 42 may be attached to the base 26 via a compliant material interface in the manner shown for attachment of the tiles 38. The compliant material interface enables resilient movement of the pins 42 relative to the base 26.

Figure 7:
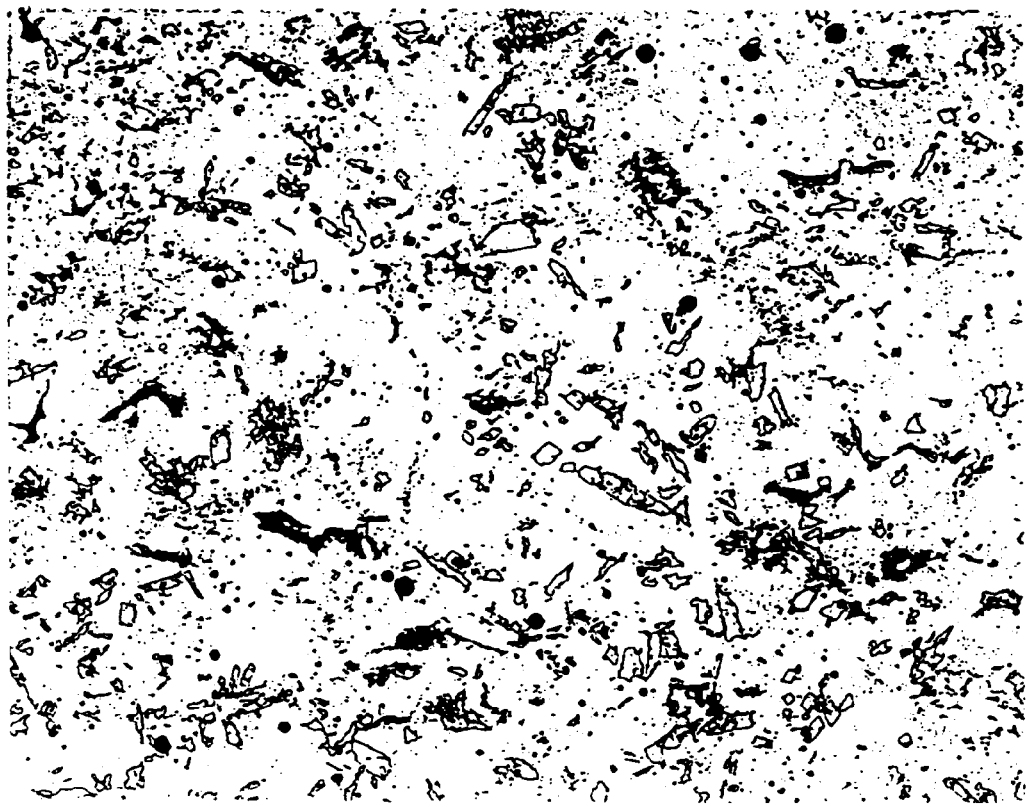
FIG. 7, which is a photograph of a section of the plasma spray coating magnified 100 times.

A section of the plasma spray coating magnified 100 times is illustrated in the photograph forming FIG. 7. As illustrated in the photograph, the tungsten carbide particles (outlined structures) are relatively uniformly dispersed in the nickel-chrome alloy matrix material (gray background), some porosity (dark spots) are also present.

As will be understood from the foregoing description, according to the present invention, several embodiments of a safety brake system for stopping an elevator have been described. The fused sprayed friction coating employed therein provides a high coefficient of friction which is advantageous in that lower normal forces and smaller, lighter springs and safeties can be employed. It is to be understood that the embodiments described herein are merely illustrative of the principles of the invention. Various modifications may be made thereto by persons skilled in the art which will embody the principles of the invention and fall within the spirit and scope thereof. Hence, the present invention is deemed limited only by the appended claims and the reasonable interpretation thereof.

What is claimed is:

1. An elevator safety brake for stopping an elevator car, the brake comprising:

a brake shoe having a base and further having a rail contacting friction surface attached to the base for contacting an elevator guide rail surface, wherein at least a portion of the rail contacting friction surface comprises a coating obtained by providing an admixture of nickel alloy particles and particles containing a hard, inert material selected from the group consisting of metal oxides, metal carbides and metal nitrides, spraying the admixture onto the base and fusing the sprayed admixture; and means for pressing the rail contacting friction material of the brake shoe against the guide rail surface to stop the elevator car.

2. The brake as defined in claim 1, wherein the nickel alloy is a nickel-chromium alloy.

3. The brake as defined in claim 2, wherein the nickel-chromium alloy particles comprise approximately 55 to 95 weight percent of the admixture.

4. The brake as defined in claim 1, wherein the hard, inert material is tungsten carbide.

5. The brake as defined in claim 4, wherein the nickel alloy particles comprise approximately 55 to 95 weight percent of the admixture.

6. The brake as defined in claim 1, wherein the nickel alloy is nickel-chromium and the hard, inert material is tungsten carbide.

7. The brake as defined in claim 6, wherein the nickel alloy particles comprise approximately 55 to 95 weight percent of the admixture.

8. The brake as defined in claim 6, wherein the nickel alloy particles comprise approximately 85 weight percent of the admixture.

9. The brake as defined in claim 8, wherein the particles have sizes in the range of approximately −50 to +20 mesh.

10. The brake as defined in claim 9, wherein the admixture is sprayed via a plasma spray process.

11. The brake as defined in claim 10, wherein the coating is fused by placing the coating in an inert atmosphere, raising the temperature of the atmosphere to approximately 1000° C. at a rate of about 50° C. per minute, holding the inert atmosphere at about 1000° C. for approximately 10 minutes, raising the temperature of the inert atmosphere to approximately 1080° C. at a rate of about 25° C. per minute, holding the inert atmosphere at about 1080° C. for approximately 25 minutes, lowering the temperature of the inert atmosphere to about 482° C. at a rate of approximately 20° C. per minute, holding the temperature at 482° C. for 1 minute, and lowering the temperature of the inert atmosphere to room temperature at a rate of about 4° C. per minute.

12. The brake as defined in claim 1, wherein the rail contacting friction surface is attached to the base via a compliant material which enables the rail contacting friction surface to move relative to the base.

* * * * *